Oct. 9, 1956 S. CARBONETTO 2,766,422
METHODS AND ARRANGEMENTS FOR DETECTING
LAYERS OF HYDROCARBONS IN THE GROUND
Filed July 28, 1951 2 Sheets-Sheet 1
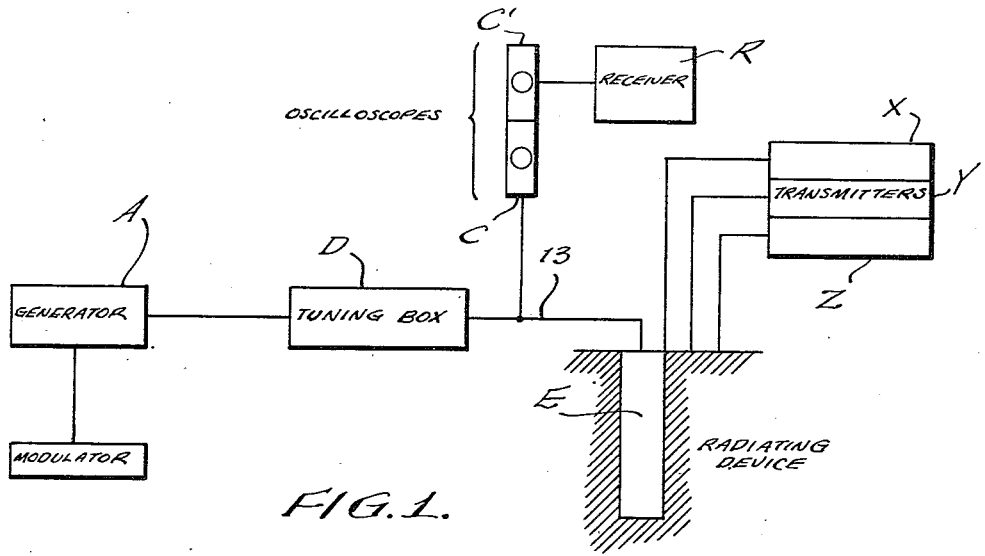
FIG.1.
FIG.2.
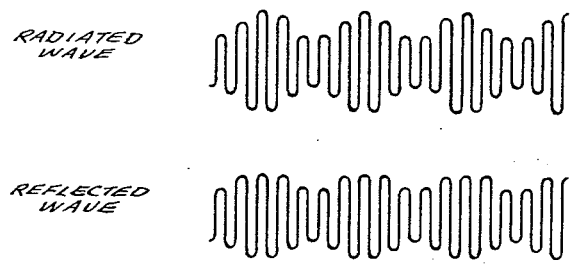
FIG.3.
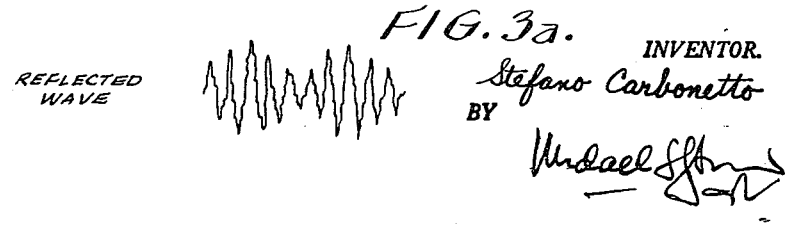
FIG.3a.
INVENTOR.
Stefano Carbonetto
BY

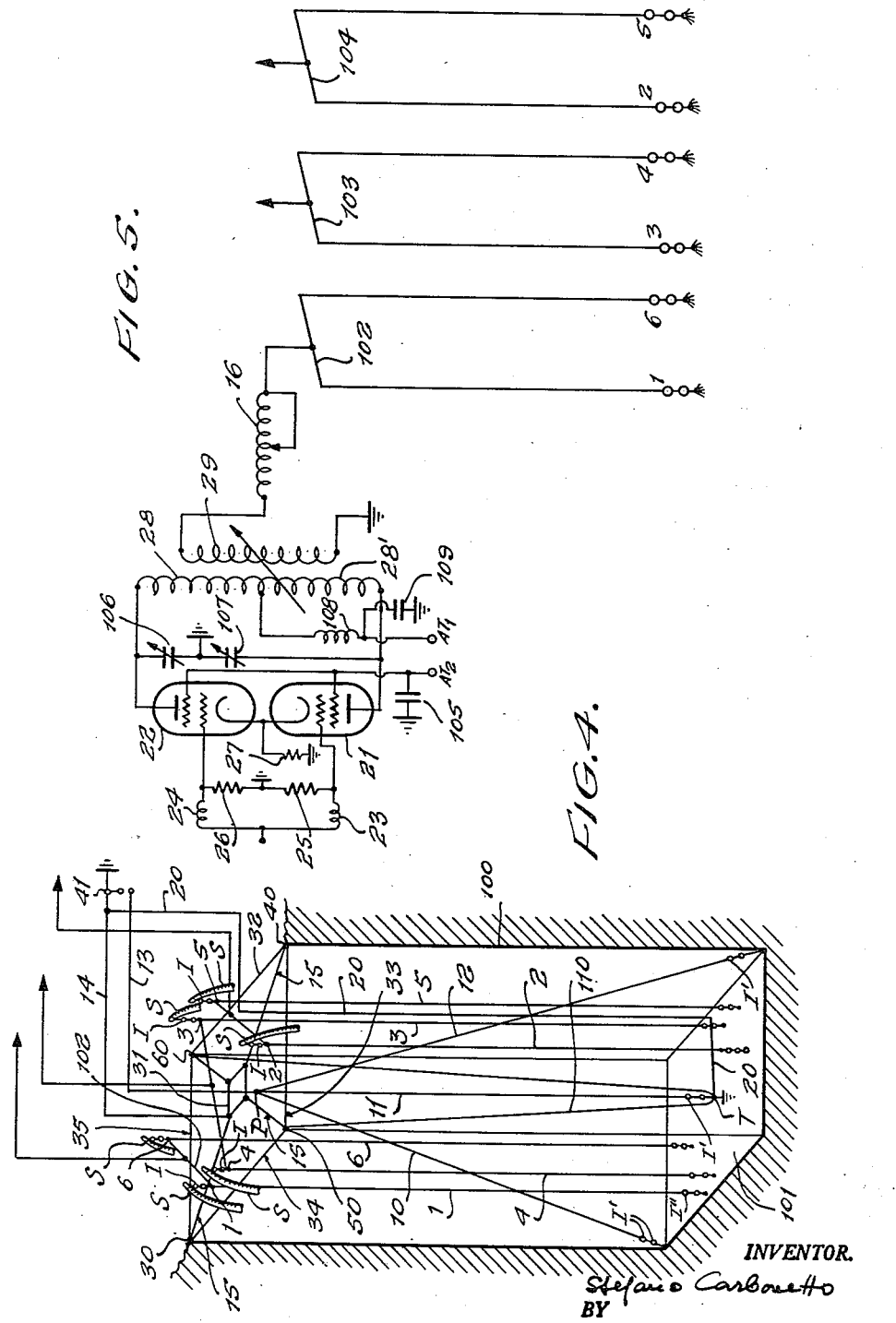

United States Patent Office 2,766,422
Patented Oct. 9, 1956

2,766,422

METHODS AND ARRANGEMENTS FOR DETECTING LAYERS OF HYDROCARBONS IN THE GROUND

Stefano Carbonetto, Milan, Italy

Application July 28, 1951, Serial No. 239,074

Claims priority, application Italy July 2, 1949

13 Claims. (Cl. 324—6)

The present invention relates to a method and an arrangement for detecting layers of hydrocarbons in the ground by means of radio waves reflected by the layers of hydrocarbons.

The present application is a continuation-in-part of my co-pending application No. 128,710, filed November 22, 1949, for Radio-Electric System for Hydrocarbon Searches, now abandoned.

It is an object of the present invention to provide an arrangement for detecting layers of hydrocarbons in the ground which is relatively simple and sturdy.

It is another object of the present invention to provide a method and an arrangement preventing any substantial horizontal propagation of the wave in the ground.

It is another object of the present invention to shield the arrangement against any interference.

A method according to the present invention comprises the steps of generating a high-frequency carrier wave, modulating the high-frequency carrier wave with a relatively low-frequency wave so as to generate a modulated carrier wave, radiating the modulated carrier wave into the ground, receiving the modulated wave reflected by layers of ground having particular electric characteristics and comparing the radiated modulated wave with the reflected and distorted wave.

Preferably the modulated carrier wave is radiated in a vertical direction into the ground.

In a preferred embodiment of the present invention, one or more unmodulated waves, having a frequency substantially equal to that of a higher harmonic of the carrier wave, are generated and radiated in the ground by radiating members in combination with those radiating the main modulated carrier wave.

An arrangement according to the present invention comprises in combination an antenna for radiating a modulated carrier wave into the ground, the antenna being arranged in a substantially vertical direction in a well in the ground having a depth between 1 meter and 10 meters; means for receiving the modulated wave reflected to the ground, and means for comparing the reflected wave with the radiated wave.

Preferably the well in the ground has a depth of substantially four meters.

In a preferred embodiment of the present invention the antenna includes a vertical middle branch wire and two inclined side branch wires, the branch wires of the antenna merging with one another at a point below and near the top level of the well.

In a preferred embodiment a static screen (or Faraday screen) is arranged near the top level of the square well, the static screen including a major wire square having the vertices thereof arranged substantially at the corners of the square well, a minor wire square similar to the major wire square and arranged with the sides thereof substantially parallel to the sides of the major wire square so that each vertex of the major wire square is arranged opposite to a vertex of the minor wire square, and wires connecting, respectively, a vertex of said major wire square with the vertex of the minor wire square arranged opposite thereto.

In a preferred embodiment of the present invention a plurality of vertical wires is arranged in the well and is insulated therefrom, the vertical wires radiating in addition to the modulated carrier wave an unmodulated wave or waves having a frequency or frequencies substantially equal to that of a higher harmonic of the carrier wave.

Preferably the vertical wires are arranged in pairs, each of the pairs being symmetrical with respect to the branch wires of the antenna, electrical connections being provided connecting the top ends of said vertical wires of the pairs, respectively, and supplying the same unmodulated waves, respectively, having frequencies substantially equal to those of higher harmonics of the carrier wave.

Preferably the vertical wires extend substantially over the total depth of the well.

In a preferred embodiment of the present invention a first connection connects ground at the bottom of the well and a point of the major wire square.

Preferably a second connection connects ground and a point of said minor wire square.

Preferably a third connection connects the ground at the bottom of the well to the second connection near the ground thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a block diagram of an arrangement according to the present invention;

Fig. 2 shows diagrammatically a wave radiated into the ground;

Fig. 3 is a similar diagram showing only as an example, a reflected wave;

Fig. 3a is a diagram showing another form of the reflected wave.

Fig. 4 is a perspective view of the well and the parts of the arrangement according to the invention arranged therein; and Fig. 5 is a diagrammatic view of a detail of lateral radiating wires of Fig. 4 together with the last amplifier stage of the auxiliary generators.

Referring now to the drawings and first to Fig. 1, a generator or transmitter A producing waves between 80 and 550 kilocycles is connected to a modulator B which modulates the carrier waves produced by the generator. The generator A is connected to a tuning box D including inductors and capacitors (not shown) and permitting to adapt the impedance of the output circuit of the generator A to the radiating device E more fully to be described hereinafter. The generator or transmitter A has preferably a power of the order from 100 to 150 watts. The radiating device E is also connected to auxiliary transmitters X, Y, Z for a purpose to be explained more fully hereinafter. A receiver R arranged preferably above the radiating device E receives the modulated waves reflected by any hydrocarbon layers in the ground. C and C' are two oscilloscopes preferably arranged side by side, oscilloscope C is connected to the radiating device E whereas the oscilloscope C' is connected to the receiver R. In consequence thereof on the screen of the oscilloscope C appear waves for instance as shown in Fig. 2 corresponding to the modulated carried wave produced by the main generator or transmitter, A. The reflected waves which may be for instance as shown in Fig. 3 or 3a, appear on the screen of the oscilloscope C', these reflected waves being distorted and having a different modulation degree as the modulating wave is affected by the hydrocarbon layers in the ground, whereas the carrier wave is hardly affected at all. In fact, the hydrocarbon layers almost completely reflect the carrier wave but distort the modulating wave so that the amplitude and the shape of the modulation of the reflected waves as shown in Fig. 3 and Fig. 3a are different from that of, the radiated wave as shown in Fig. 2. Thus it will be seen that the hydrocarbon layers influence the modulation of the carrier wave after reflection thereof so that the presence of hydrocarbon layers can be easily ascertained by means of the oscilloscope C and C'.

Referring now to Fig. 4 showing in greater detail the design of the radiating device E, it will be seen that the same is placed in a square well 100 of the ground which has a depth between 1 meter and 10 meters, preferably of 4 meters. A wire 13 is connected to the tuning box D in Fig. 1 and leads to an antenna having a vertical middle branch wire 11 and two inclined side branch wires 10, 12 which merge with one another at the point P below and near the top level of the well 100. The branch wires of 10, 11 and 12 of the antenna extend substantially to the bottom 101 of the well 100 but are insulated from the same by insulators such as I'.

Furthermore, substantially vertical wires 1 to 6 are arranged in the well 100 and extend substantially over the total depth thereof but are insulated from the bottom 101 of the well 100 by insulators such as I". The wires are arranged in pairs, the wires 1 and 6 forming one pair, the wires 3 and 4 forming a second pair, and the wires 2 and 5 forming a third pair as shown in Fig. 5. At the top the wires 1 to 6 are connected over insulators I to horns S arranged at the outside of the top level of the well 100 and being bent so as to have the tips thereof arranged above the well. The wire pairs are arranged symmetrical with respect to the branch wires 10, 11 and 12 of the antenna and are connected, respectively, at the top thereof by wire bridges 102, 103 and 104. The wire bridges 102, 103 and 104 are connected, respectively, to the auxiliary or secondary generators X, Y, Z shown in Fig. 1 and the last amplifying stage of the generator X is shown in Fig. 5. This last stage shows two tetrodes 21 and 22 connected in push-pull. The cathodes of the tetrodes 21 and 22 are connected to ground over a resistor 27. The control grids of the tetrodes 21, 22 are connected to inductors 23 and 24, respectively, and resistors 25 and 26, respectively, one end of which is connected to ground whereas the other end thereof carries the potentials to be applied, respectively, between the cathodes and the control grids of each of the two tetrodes 21 and 22. The screen grids of the tetrodes 21, 22 are connected in parallel to a tap AT₂ of a high voltage anode battery (not shown) and connected over a condenser 105 to ground. The anodes of the tetrodes 21 and 22 are connected over adjustable condensers 106 and 107, respectively, to ground and to the parts 28, 28' of the primary of an adjustable high-frequency transformer, the junction of which is connected to an inductor 108 which is connected to the high potential terminal AT₁ of the anode battery (not shown) and over a condenser 109 to ground. The secondary 29 of the high-frequency transformer is connected at one end thereof to ground and at the other end thereof to a variable inductor 16 which is connected to the bridge 102. It is to be understood that the other bridges 103, 104 are similarly connected to the generators Y and Z respectively.

Furthermore, a so-called static screen or Faraday screen is arranged at the top level of the well 100. This static screen consists of a major wire square 32, 33, 34, 35 having the vertices 30, 40, 50 and 60 thereof arranged at the vertices of the top level square of the well. Furthermore, the static screen includes a minor wire square 31 the sides of which are arranged, respectively, parallel to the sides 32—35 of the major wire square so that the minor wire square 31 is similar to the major wire square 32—35. As will be seen from Fig. 4 each vertex of the major wire square 32—35 is arranged opposite to a vertex of the minor wire square 31, and wires 15 are arranged diagonally so as to connect the opposite vertices of the major wire square 32—35 and the minor wire square 31 with each other. The static screen is grounded by a connection 110 which connects the vertex 50 and 60 of the major wire square to a ground T arranged at the bottom 101 of the well 100. Furthermore, the minor wire square 31 is grounded by a connection 14 leading to a ground 41 outside the well 100. A connection 20 connects the ground T at the bottom 101 of the well 100 with the ground 41 so that any potential differences between the ground T and 41 are compensated and the static screen is kept perfectly at ground potential and intercepts the radiation of other waves which are not wanted, that is, of all waves different from those radiated to the well 100 below the static screen, and more particularly the waves radiated by the branch wires 10, 11, 12 of the antenna and those radiated by the vertical wires 1 to 6 connected to the auxiliary generators or transmitters X, Y, Z, respectively. The static screen can be adjusted by varying the dimensions of the wire squares and particularly those of the minor wire square 31. Furthermore, an adjustment can be achieved by varying the distance of the merging point P of the branch wires 10, 11 and 12 of the antenna with respect to the double wire square, thereby varying the electrical capacity between the system of conductors 31 to 35 and 15 and the system of the branch wires 10, 11 and 12.

The operation of this device is as follows:

The generator A and auxiliary generators X, Y, Z (if any) are excited and thereby a modulated carrier wave is radiated by the antenna 10, 11, 12 substantially vertically downwards. The oscilloscope C shows the shape of the radiated wave (for instance that represented by Fig. 2). At the same time the receiver R receives the reflected wave which is made visible by the oscilloscope C' shown in Fig. 1. If any hydrocarbon layers are present in the ground, the reflected wave will be distorted in the modulation thereof as shown in Fig. 3 or Fig. 3a. Therefore the presence of hydrocarbon layers can be simply ascertained by looking at the curves drawn by the oscilloscopes C and C' which are close together.

The generators X, Y, Z, produce waves which are higher harmonics for instance the third, fifth or seventh harmonic of the carrier wave produced by the generator A. These unmodulated waves produced by the generators X, Y, and Z prevent any substantial propagation in horizontal direction of the carrier wave produced by the generator A and thus contribute to a great extent to the practical success of the method and arrangement according to the invention.

It will be understood that each of the elements described above, or two or more together, may also find a useful application in other types of methods and arrangements for detecting layers of hydrocarbons in the ground, differing from the types described above.

While the invention has been illustrated and described as embodied in a method and an arrangement for detecting layers of hydrocarbons in the ground by means of radio waves reflected by the layers of hydrocarbons, it is not intended to be limited to the details shown, since various modifications and structural changes may be made without departing in any way from the spirit of the present invention.

Of course, in the arrangement above described the oscilloscopes may be substituted by other detecting means of said wave, without departing from the scope of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for detecting layers of hydrocarbons in the ground by means of radio waves reflected by the layers of hydrocarbons, comprising in combination, transmitting means producing an amplitude modulated carrier wave, an antenna connected to said transmitting means, said antenna being arranged in a well in the ground having a depth of between 1 meter and 10 meters and including a vertical branch wire and two inclined side branch wires, said branch wires of said antenna merging with one another at a point below and near the top level of the well; means mounted above the well in the ground for receiving the modulated wave reflected by the ground; and means for comparing the amplitude and shape of the reflected wave with those of the radiated wave.

2. An arrangement for detecting layers of hydrocarbons in the ground by means of radio waves reflected by the layers of hydrocarbons, comprising in combination, transmitting means producing an amplitude modulated carrier wave, an antenna connected to said transmitting means, said antenna being arranged in a well in the ground having a depth of substantially 4 meters and including a vertical branch wire and two inclined side branch wires, said branch wires of said antenna merging with one another at a point below and near the top level of the well; means mounted above the well in the ground for receiving the modulated wave reflected by the ground; and means for comparing the amplitude and shape of the reflected wave with those of the radiated wave.

3. An arrangement for detecting layers of hydrocarbons in the ground by means of radio waves reflected by the layers of hydrocarbons, comprising in combination, transmitting means producing an amplitude modulated carrier wave, an antenna connected to said transmitting means, said antenna being arranged in a square well in the ground having a depth of between 1 meter and 10 meters and including a vertical branch wire and two inclined side branch wires, said branch wires of said antenna merging with one another at a point below and near the top level of the well; a static screen arranged at the top level of the well, said static screen including a major wire square having the vertices thereof arranged substantially at the corners of the square well, a minor wire square similar to said major wire square and arranged with the sides thereof substantially parallel, respectively, to the sides of said major wire square so that each vertex of said major wire square is arranged opposite a vertex of said minor wire square, and wires connecting, respectively, a vertex of said major wire square with the vertex of said minor wire square arranged opposite thereto; means for receiving the modulated wave reflected by the ground; and means for comparing the amplitude and shape of the reflected wave with those of the radiated wave.

4. An arrangement for detecting layers of hydrocarbons in the ground by means of radio waves reflected by the layers of hydrocarbons, comprising in combination, transmitting means producing a modulated carrier wave, an antenna connected to said transmitting means, said antenna being arranged in a well in the ground having a depth of between 1 meter and 10 meters and including a vertical branch wire and two inclined side branch wires, said branch wires of said antenna merging with one another at a point below and near the top level of the well; a plurality of vertical wires arranged in the well and being insulated therefrom; at least one generator connected to said vertical wires for generating an unmodulated wave having a frequency substantially equal to that of a higher harmonic of the carrier wave so that said vertical wires radiate said unmodulated wave; means for receiving the modulated wave reflected by the ground; and means for comparing the amplitude and shape of the reflected wave with that of the radiated wave.

5. An arrangement for detecting layers of hydrocarbons in the ground by means of radio waves reflected by the layers of hydrocarbons, comprising in combination, transmitting means producing a modulated carrier wave, an antenna connected to said transmitting means, said antenna being arranged in a well in the ground having a depth of between 1 meter and 10 meters and including a vertical branch wire and two inclined side branch wires, said branch wires of said antenna merging with one another at a point below and near the top level of the well; a plurality of vertical wires arranged in the well and being insulated therefrom, said vertical wires being arranged in pairs, each of said pairs being symmetrical with respect to said branch wires of said antenna; a plurality of generators, each of said generators being connected respectively to one of said pairs of vertical wires and generating a respectively different higher harmonic of said carrier wave, which harmonics are respectively radiated by said vertical wires; means for receiving the modulated wave reflected by the ground; and means for comparing the amplitude and shape of the reflected wave with those of the radiated wave.

6. An arrangement for detecting layers of hydrocarbons in the ground by means of radio waves reflected by the layers of hydrocarbons, comprising in combination, transmitting means producing a modulated carrier wave, an antenna connected to said transmitting means, said antenna being arranged in a well in the ground having a depth of between 1 meter and 10 meters and including a vertical branch wire and two inclined side branch wires, said branch wires of said antenna merging with one another at a point below and near the top level of the well; a plurality of vertical wires arranged in the well and being insulated therefrom, said vertical wires extending substantially over the total depth of said well; at least one generator connected to said vertical wires for generating an unmodulated wave having a frequency substantially equal to that of a higher harmonic of the carrier wave so that said vertical wires radiate said unmodulated wave in a substantially horizontal direction; means for receiving the modulated wave reflected by the ground; and means for comparing the amplitude and shape of the reflected wave with that of the radiated wave.

7. An arrangement for detecting layers of hydrocarbons in the ground by means of radio waves reflected by the layers of hydrocarbons, comprising in combination, transmitting means producing a modulated carrier wave, an antenna connected to said transmitting means, said antenna being arranged in a well in the ground a depth of between 1 meter and 10 meters and including a vertical branch wire and two inclined side branch wires, said branch wires of said antenna merging with one another at a point below and near the top level of the well; a plurality of vertical wires arranged in the well and being insulated therefrom, said vertical wires extending substantially over the total depth of said well, and being arranged in pairs, each of said pairs being symmetrical with respect to said branch wires of said antenna; a plurality of generators, each of said generators being connected respectively to one of said pairs of vertical wires and generating a respectively different higher harmonic of said carrier wave, which harmonics are respectively radiated in a substantially horizontal direction by said vertical wires; means for receiving the modulated wave reflected by the ground; and means for comparing the amplitude and shape of the reflected wave with those of the radiated wave.

8. An arrangement for detecting layers of hydrocarbons in the ground by means of radio waves reflected by the layers of hydrocarbons, comprising in combination, transmitting means producing an amplitude modulated carrier wave, an antenna connected to said transmitting means, said antenna being arranged in a square well in the ground having a depth of between 1 meter and 10 meters and including a vertical branch wire and two inclined side branch wires, said branch wires of said antenna merging with one another at a point below and near the top level of the well; a plurality of vertical wires arranged in the well and being insulated therefrom, said vertical wires radiating in addition to the modulated carrier wave radiated by said antenna into the ground an unmodulated wave having a frequency substantially equal to that of a higher harmonic of the carrier wave; a static screen arranged at the top level of the well, said static screen including a major wire square having the vertices thereof arranged substantially at the corners of the square well, a minor wire square similar to said major wire square and arranged with the sides thereof substantially parallel, respectively, to the sides of said major wire square is arranged opposite a vertex of said minor wire square, and wires connecting, respectively, a vertex of said major wire square with the vertex of said minor wire square arranged opposite thereto; means for receiving the modulated wave reflected by the ground; and means for comparing the amplitude of the modulation of the reflected wave with that of the radiated wave.

9. An arrangement for detecting layers of hydrocarbons in the ground by means of radio waves reflected by the layers of hydrocarbons, comprising in combination, transmitting means producing an amplitude modulated carrier wave, an antenna connected to said transmitting means, said antenna being arranged in a square well in the ground having a depth of between 1 meter and 10 meters and including a vertical branch wire and two inclined side branch wires, said branch wires of said antenna merging with one another at a point below and near the top level of the well; a plurality of vertical wires arranged in the well and being insulated therefrom symmetrical with respect to said branch wires of said antenna; a plurality of generators, each of said generators being connected respectively to one of said pairs of vertical wires and generating a respectively different higher harmonic of said carrier wave, which harmonics are respectively radiated by said vertical wires; a static screen arranged at the top level of the wall, said static screen including a major wire square having the vertices thereof arranged substantially at the corners of the square well, a minor wire square similar to said major wire square and arranged with the sides thereof substantially parallel, respectively, to the sides of said major wire square so that each vertex of said major wire square is arranged opposite a vertex of said minor wire square, and wires connecting, respectively, a vertex of said major wire square with the vertex of said minor wire square arranged opposite thereto; means for receiving the modulated wave reflected by the ground; and means for comparing the amplitude and shape of the reflected wave with those of the radiated wave.

10. An arrangement for detecting layers of hydrocarbons in the ground by means of radio waves reflected by the layers of hydrocarbons, comprising in combination, transmitting means producing an amplitude modulated carrier wave, an antenna connected to said transmitting means, said antenna being arranged in a square well in the ground having a depth of between 1 meter and 10 meters and including a vertical branch wire and two inclined side branch wires, said branch wires of said antenna merging with one another at a point below and near the top level of the well; a plurality of vertical wires arranged in the well and being insulated therefrom, said vertical wires extending substantially over the total depth of said well and being arranged in pairs, each of said pairs being symmetrical with respect to said branch wires of said antenna; a plurality of generators, each of said generators being connected respectively to one of said pairs of vertical wires and generating a respectively different higher harmonic of said carrier wave, which harmonics are respectively radiated in a substantially horizontal direction by said vertical wires; a static screen arranged at the top level of the well, said static screen including a major wire square having the vertices thereof arranged substantially at the corners of the square well, a minor wire square similar to said major wire square and arranged with the sides thereof substantially parallel, respectively, to the sides of said major wire square so that each vertex of said major wire square is arranged opposite a vertex of said minor wire square, and wires connecting, respectively, a vertex of said major wire square with the vertex of said minor wire square arranged opposite thereto; means for receiving the modulated wave reflected by the ground; and means for comparing the amplitude and shape of the reflected wave with those of the radiated wave.

11. An arrangement for detecting layers of hydrocarbons in the ground by means of radio waves reflected by the layers of hydrocarbons, comprising in combination, transmitting means producing an amplitude modulated carrier wave, an antenna connected to said transmitting means, said antenna being arranged in a square well in the ground having a depth of between 1 meter and 10 meters and including a vertical branch wire and two inclined side branch wires, said branch wires of said antenna merging with one another at a point below and near the top level of the well; a plurality of vertical wires arranged in the well and being insulated therefrom, said vertical wires extending substantially over the total depth of said well and being arranged in pairs, each of said pairs being symmetrical with respect to said branch wires of said antenna; a plurality of generators, each of said generators being connected respectively to one of said pairs of vertical wires and generating a respectively different higher harmonic of said carrier wave, which harmonics are respectively radiated in a substantially horizontal direction by said vertical wires; a static screen arranged at the top level of the well, said static screen including a major wire square having the vertices thereof arranged substantially at the corners of the square well, a minor wire square similar to said major wire square and arranged with the sides thereof substantially parallel, respectively, to the sides of said major wire square so that each vertex of said major wire square is arranged opposite a vertex of said minor wire square, and wires connecting, respectively, a vertex of said major wire square with the vertex of said minor wire square arranged opposite thereto; a first connection between ground at the bottom of the well and a point of said major wire square; a second connection between ground and a point of said minor wire square; a third connection connecting the ground at the bottom of the well to said second connection near the ground thereof; means for receiving the modulated wave reflected by the ground; and means for comparing the amplitude and shape of the reflected wave with that of the radiated wave.

12. An arrangement for detecting layers of hydrocarbons in the ground by means of radio waves reflected by the layers of hydrocarbons comprising, in combination, a directive antenna arrangement located in a well in the ground and providing a highly directive beam pattern substantially in the vertical downward direction; transmitter means coupled to said antenna arrangement for supplying thereto low-frequency amplitude modulated electromagnetic high-frequency wave energy; receiver means tuned to said high-frequency wave energy;

and display means coupled to said receiver means and to said transmitter means for displaying the transmitted modulated high-frequency wave energy and the modulated high-frequency wave energy reflected from said layers and received by said receiver means.

13. An arrangement for detecting stratas of hydrocarbons in the ground by means of radio waves reflected by said stratas comprising, in combination, a directive antenna arrangement located in a vertical well in the ground and providing a highly directive beam pattern substantially in the vertical downward direction; transmitter means coupled to said antenna arrangement for supplying thereto relatively low-frequency amplitude modulated electromagnetic high-frequency wave energy; receiver means tuned to said high-frequency wave energy; first cathode ray tube indicator means coupled to said transmitter means for displaying the modulated wave energy transmitted thereby; and second cathode ray tube indicator means coupled to said receiver means and arranged adjacent said first cathode ray tube indicator means for displaying the modulated wave energy reflected from said stratas and received by said receiver means.

References Cited in the file of this patent
UNITED STATES PATENTS

| | | |
|---|---|---|
| 1,471,165 | Jones | Oct. 16, 1923 |
| 2,077,707 | Melton | Apr. 20, 1937 |
| 2,139,460 | Potapenko | Dec. 6, 1938 |
| 2,283,617 | Wilmotte | May 19, 1942 |
| 2,364,209 | Green | Dec. 5, 1944 |
| 2,426,918 | Barret | Sept. 2, 1947 |
| 2,444,388 | De Vries | June 29, 1948 |
| 2,455,941 | Muskat et al. | Dec. 14, 1948 |
| 2,502,464 | Lehmann | Apr. 4, 1950 |
| 2,517,951 | Wheeler | Aug. 8, 1950 |